United States Patent [19]

Momiyama

[11] 4,437,735
[45] Mar. 20, 1984

[54] INVERTED TELEPHOTO TYPE WIDE ANGLE OBJECTIVE OF LARGE RELATIVE APERTURE

[75] Inventor: Kikuo Momiyama, Yokohama, Japan

[73] Assignee: Canon Kabushiki Kaisha, Tokyo, Japan

[21] Appl. No.: 339,709

[22] Filed: Jan. 15, 1982

[30] Foreign Application Priority Data

Jan. 22, 1981 [JP] Japan .................................. 56-7134

[51] Int. Cl.$^3$ ..................... G02B 9/64; G02B 13/04
[52] U.S. Cl. .................................. 350/458; 350/450
[58] Field of Search ........................... 350/458, 450

[56] References Cited

U.S. PATENT DOCUMENTS 3,877,795 4/1975 Yamashita ........................... 350/458

Primary Examiner—John K. Corbin
Assistant Examiner—Rebecca D. Gass
Attorney, Agent, or Firm—Toren, McGeady and Stanger

[57] ABSTRACT

The wide angle objective of the inverted telephoto type with a high relative aperture. It includes from front to rear, a first lens group of negative power, a second lens group of positive power and a third lens group of positive power, well corrected for the various aberrations with predetermined conditions for the focal length of each lens group, lens form and refractive indices of the glasses of the lens elements.

5 Claims, 15 Drawing Figures

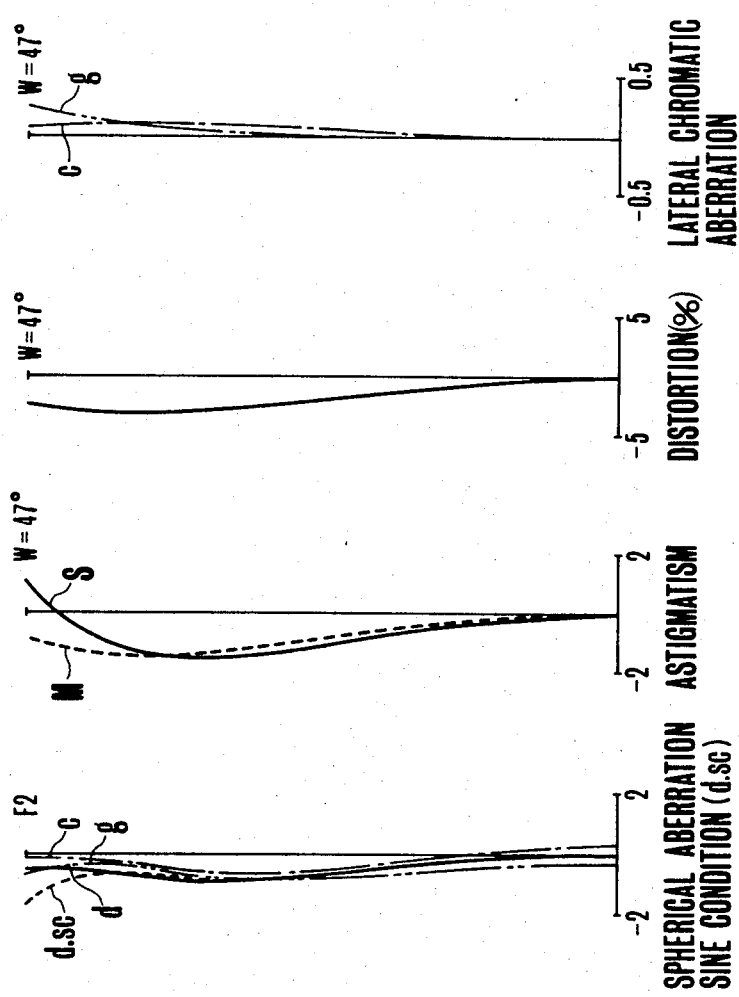

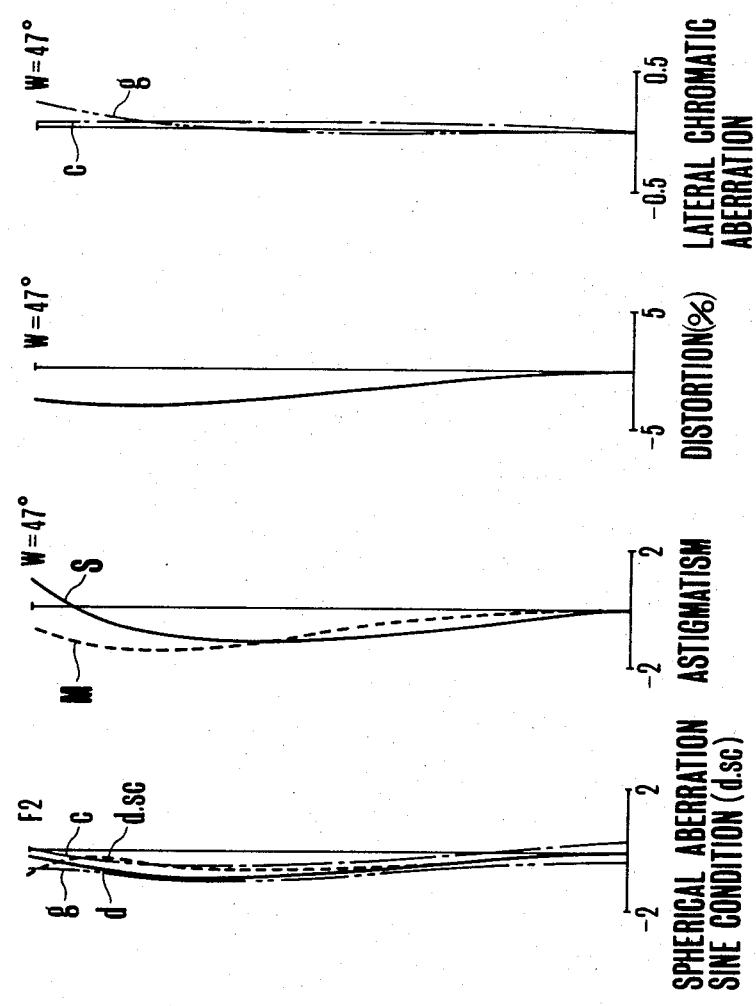

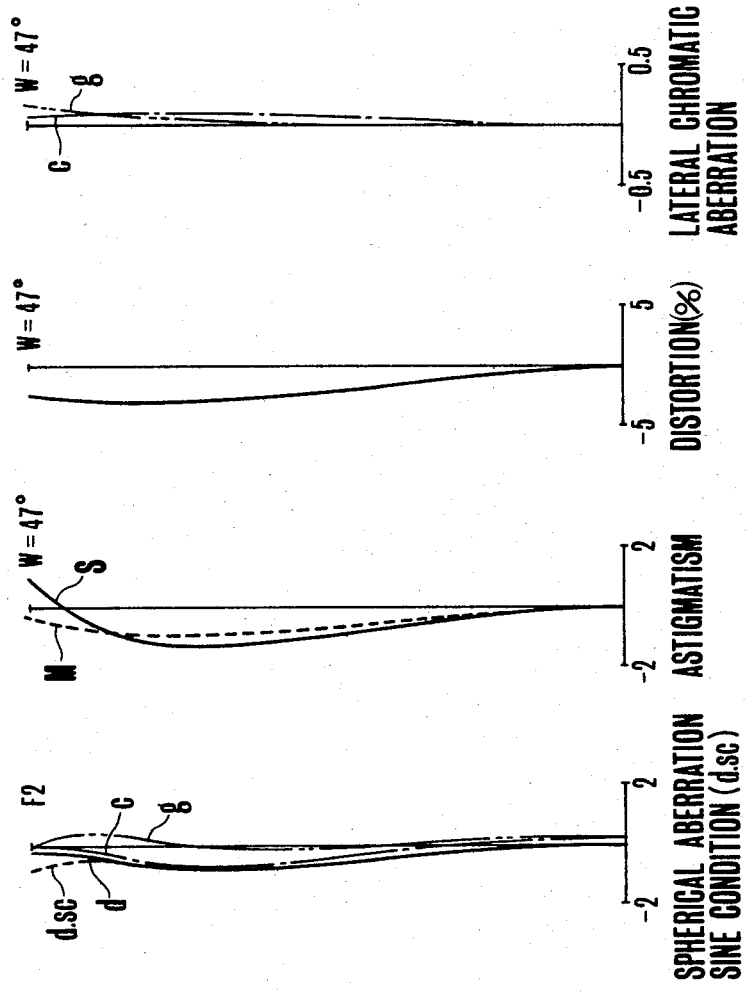

INVERTED TELEPHOTO TYPE WIDE ANGLE OBJECTIVE OF LARGE RELATIVE APERTURE

BACKGROUND OF THE INVENTION

1. Field of the Invention

This invention relates to inverted telephoto type wide angle objectives of high relative aperture including those having a semi-angular field of 47° with a relative aperture of F/2.0, whose bulk and size is reduced and which are well corrected for aberrations.

2. Description of the Prior Art

Recently, in the field of wide angle objectives for use in single lens reflex cameras, progress has been made in the reduction of the bulk and size of the lens system and increasing of its relative aperture. Most of these wide angle objectives employ the so-called inverted telephoto type lens configuration which offers the advantage that the back focal distance can be generally elongated. On the other hand, because the symmetry of lens configuration is broken, it becomes difficult to achieve good correction of aberrations. This difficulty tends to rapidly increase as the angular field of view and the relative aperture increase and the bulk and size of the lens system is reduced.

The use of the inverted telephoto type in the design of such lens system is disclosed in, for example, U.S. Pat. Nos. 3,748,021, 3,976,366, 3,981,563, 4,013,350, 4,061,421 and 4,188,092.

SUMMARY OF THE INVENTION

It is an object of the present invention to provide an inverted telephoto type wide angle objective of high relative aperture for use in single lens reflex cameras in which despite the increases in the angular field of view and the relative aperture, all aberrations are well corrected, and further the lens system can be made compact.

The wide angle objective of the invention comprises three groups, of which the first counting from the front is of negative refractive power, the second is of positive refractive power and the third is of positive refractive power, the focal lengths of the lens groups, with the lens forms and the refractive indices of the glasses of the lens elements being determined to provide good correction of aberrations.

BRIEF DESCRIPTION OF THE DRAWINGS

FIGS. 4(a) to 4(d), 5(a) to 5(d) and 6(a) to 6(d) are graphic representations of the various aberrations of the objectives of FIGS. 1, 2 and 3 respectively.

DETAILED DESCRIPTION OF THE PREFERRED EMBODIMENTS

Figure 1:
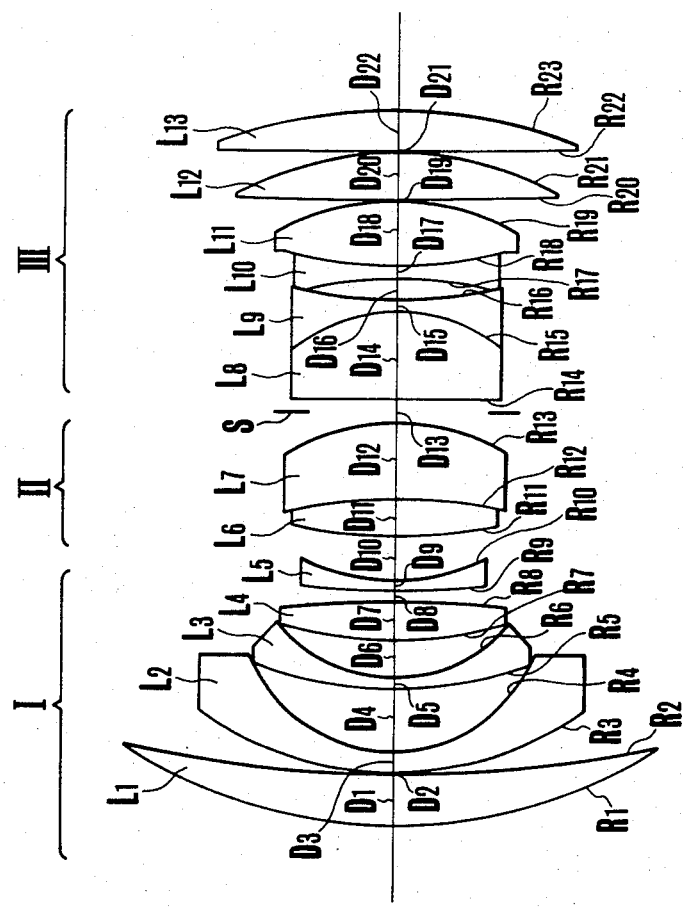
FIGS. 1, 2 and 3 are lens block diagrams of Example 1, Example 2 and Example 3 of embodiment of inverted telephoto type wide angle objectives of large relative aperture according to the present invention respectively.
Figure 2:
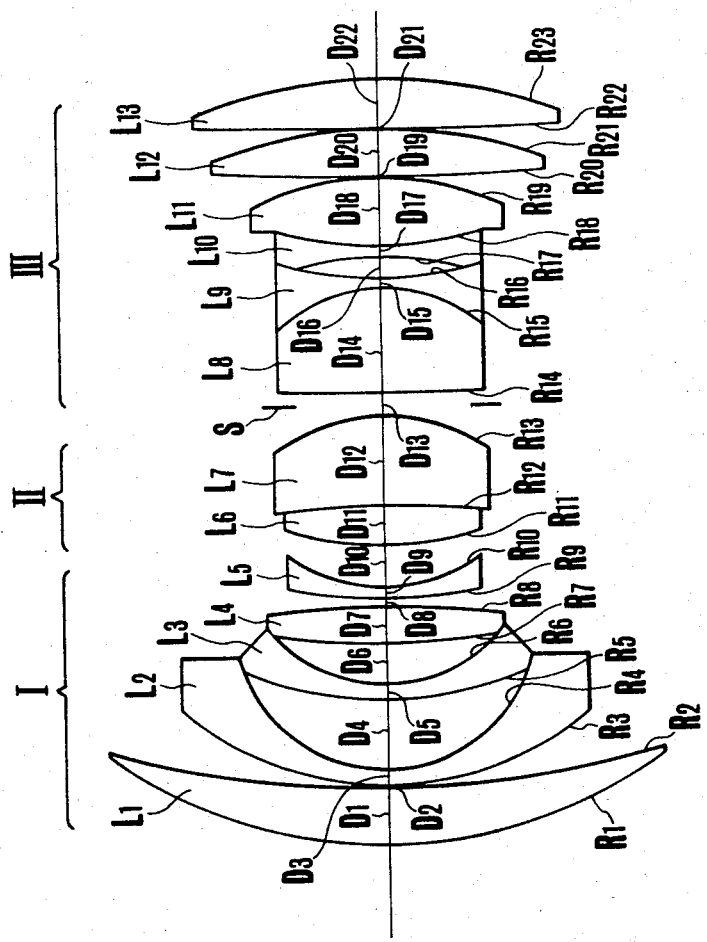
Figure 3:
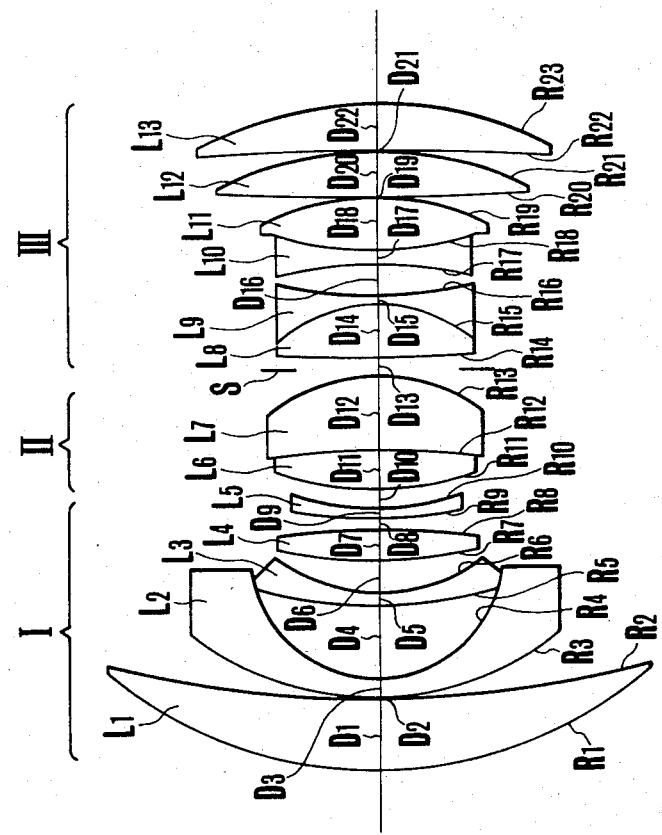

The present invention is next described in connection with embodiments thereof by reference to FIGS. 1 to 3.

In the drawings, the first lens group I has a negative refractive power, the second lens group II has a positive refractive power and the third lens group III has a positive refractive power. The first lens group I consists of, from front to rear, a positive meniscus lens L1 of forward convexity, a negative meniscus lens L2 of forward convexity, a second negative meniscus lens L3 likewise convex to the front, a positive lens L4 and a third negative meniscus lens L5 of forward convexity. The second lens group II consists of a bi-convex doublet L6, L7. The third lens group III consists of, from front to rear, a cemented lens of a positive element L8 and a negative element L9, a second cemented lens of a negative element L10 and a positive element L11 and two positive lenses L12 and L13. A stop S lies between the second and third lens groups II and III. Such lens configuration make it possible to achieve a wide angle objective of the invention. Then, in order to facilitate a further minimization of the bulk and size of the objective lens while still preserving the possibility of achieving good correction of the aberrations, the following conditions are preferably satisfied:

$$0.72 < |f_I|/f < 0.79 \text{ where } f_I < 0 \quad (1)$$

$$2.9 < D_T/f < 3.6 \quad (2)$$

$$1.2 < D_{I,II}/D_{III} < 1.7 \quad (3)$$

$$f1 > f4 \quad (4)$$

$$|f2| > |f3| \text{ where } f2, f3 < 0 \quad (5)$$

$$1.7 < (n2+n3)/2 \quad (6)$$

$$\nu1 > \nu4 \quad (7)$$

$$0.75 < |R13|/f < 0.9 \text{ where } R13 < 0 \quad (8)$$

$$50 < \nu7 \quad (9)$$

$$25 < \nu6 < 30 \quad (10)$$

$$0.30 < n10 - n11 \quad (11)$$

$$1.4 < R18/f < 1.8 \quad (12)$$

$$35 < \nu10 \quad (13)$$

$$\nu9 < 30 \quad (14)$$

$$1.7 < (n12+n13)/2 \quad (15)$$

wherein
f is the focal length of the entire system;
$f_I$ is the focal length of the 1st lens group;
$D_T$ is the total length of the lens system;
$D_{I,II}$ is the distance from the 1st surface of the 1st lens group to the last surface of the 2nd lens group;
$D_{III}$ is the distance from the 1st to the last surface of the 3rd lens group;
fi is the focal length of the i-th lens element counting from the front;
ni is the refractive index of the glass of the i-th lens element counting from the front;
$\nu i$ is the Abbe number of the glass of the i-th lens element counting from the front; and
Ri is the radius of curvature of the i-th lens surface counting from the front.

The reason why these conditions are given is as follows. Condition (1), condition (2) and condition (3) represent fundamental features of lens design. Condition (1) serves to make the negative refractive power of the first lens group I relatively strong so that, as the lens system is adapted to be used in the single lens reflex camera, a sufficient back focal distance is assured, and at the same time, the diameter of the front member is maintained minimum. When the upper limit of this range (1) is violated, the assurance of the sufficient back focal distance and the maintenance of the minimum diameter of the front member become difficult. When the lower limit is violated, the first lens group I produces large positive spherical aberrations including those of higher order, and an increase in the relative aperture becomes difficult. Condition (2) serves relatively to shorten the total length of the lens system and to achieve compactness. When the upper limit of this condition is violated, attainment of compactness becomes difficult. When the lower limit is violated, overall aberration correction becomes difficult. Condition (3) serves to minimize the diameter of the front lens member under the condition (2) by arranging the stop S relatively forward as compared with a conventional objective. When the upper limit of this condition is violated, the maintenance of the minimum diameter of the front member becomes difficult. When the lower limit is violated, the diameter of the rear member increases, and the third lens group produces large off-axis aberrations which are difficult to correct.

To achieve good correction of aberrations, each of the lens groups is given the following features. The first lens group is constructed from the positive lens L1, negative lens L2, negative lens L3, positive lens L4 and negative lens L5 which have conditions (4) to (7) within the framework of condition (1). Conditions (4) and (5) concern the focal lengths of the first and fourth lenses L1 and L4 and the second and third lenses L2 and L3 in the first lens group I and state that on whichever lens the off-axis light ray is incident at a greater height has a longer focal length than the other of lower height of incidence. Under this condition, the off-axis light ray is allowed to refract with ease so that while distortion is being corrected, various off-axis aberrations can be well corrected. Condition (6) represents higher indices of refraction of the negative lenses L2 and L3 in the first lens group which are reflected to moderate the radii of curvature. Since this leads to the possibility of constructing the first lens group in a thinner form, the diameter of the front member can be further minimized, and at the same time the various off-axis aberrations ascribable to the negative lenses can be reduced. Condition (7) concerns what glasses are used in the positive lenses arranged in the first lens group to correct chromatic aberrations of the first lens group. By virtue of condition (7), while the chromatic aberrations of the first lens group I are corrected by making the Abbe number of the first lens larger than that of the fourth lens, the color distortion and color coma ascribable to the positive lenses are minimized.

Conditions (8), (9) and (10) concern the second lens group. Condition (8) serves to compensate for the over-correction of coma by the first lens group I. When the upper limit of this condition is violated, the compensation for the over-corrected coma becomes difficult. When the lower limit is violated, the surface R13 produces large negative spherical aberration which makes it difficult to achieve the increase of an relative aperture. Condition (9) serves to prevent production of color coma from the surface R13 which takes a strong convex form under condition (8). When this condition is violated, the color coma becomes objectionably large. Condition (10) is to compensate for the under-correction of lateral chromatic aberration of the first lens group I, and represents the use of a glass of small Abbe number in the front or positive lens element L6 constituting part of the cemented lens of the second lens group II. When the upper limit of this condition is violated, under-correction of lateral chromatic aberration results. When the lower limit is violated, under-correction of longitudinal chromatic aberration results.

On the other hand, the residual unsymmetric aberrations of the first lens group I have to be compensated for by the divergent surfaces in the third lens group. As the diverging action in the third lens group is stronger, however, higher order aberrations are produced, so that an increase of the relative aperture becomes difficult to achieve. The lenses of the third lens group III are constructed so that a positive lens L8 and a negative lens L9 which are cemented together form a single component, a negative lens L10 and a positive lens L11 which are cemented together to form a second single component, a positive lens L12 and a positive lens L13 are arranged in this order from the front, that whilst the physical length of the third lens group III is made relatively long within the framework of condition (3), many diverging surfaces are provided along with conditions (11) and (12), and that additional conditions (13), (14) and (15) prevail. Condition (11) represents a large difference between the indices of refraction of the 10th and 11th lenses L10 and L11 of the doublet component, and cooperates with condition (12) to impart thereto a large diverging action. When this condition is violated, sufficient diverging action cannot be obtained even when condition (12) is satisfied, thus making it difficult to correct unsymmetrical aberrations. Condition (12) represents an optimum range of values which are to be taken by the radius of curvature of the cemented surface in view of condition (11). When the upper limit of this condition is violated, good correction of unsymmetric aberrations cannot be attained. When the lower limit is violated, aberrations of higher order are produced, thereby the increase of the relative aperture is difficult to achieve. Conditions (13) and (14) serve to correct chromatic aberrations of the third lens group III. Condition (13) represents the use of a relatively low dispersion glass in the 10th lens L10 by there is an intent to suppress production of color coma and color distortion when this lens is cemented. When the lower limit of this condition is violated, correction of color coma and color distortion becomes difficult. When the upper limit is violated, chromatic aberrations tend to be under-corrected which is difficult to compensate for even by giving condition (14). Condition (14) represents the use of a high dispersion glass in the 9th lens L9 to correct chromatic aberrations which tend to be under-corrected by condition (13). When this condition is violated, correction of the chromatic aberrations becomes difficult. Condition (15) represents an increase in the indices of refraction of the rearwardly arranged two convex lenses L12 and L13 by which spherical aberration and off-axis halo are to be corrected. When this condition is violated, correction of spherical aberration and off-axis halo becomes difficult.

In order to avoid a loss in the image quality when focusing down to shorter object distances, it is preferred for the objective of the invention to employ a focusing method that the entire lens system is axially moved forward while simultaneously the air space between the surfaces R8 and R9 or the axial air separation D8 is shortened thus maintaining good stability of aberration correction throughout the focusing range.

Example 1, Example 2 and Example 3 of specific objectives which satisfy the above-mentioned various conditions can be constructed in accordance with the following numerical data for the radii of curvature of the lens surfaces R1 to R23, the axial thicknesses and air separations D1 to D22, and the indices of refraction, n1 to n13 and the Abbe numbers $\nu 1$ to $\nu 13$ of the glasses of the lens elements.

EXAMPLE 1

| | F = 100 | | FNo = 1:2 | $2\omega = 94°$ |
|---|---|---|---|---|
| R1 = | 238.52 | D1 = 24.42 | n1 = 1.58913 | $\nu 1$ = 61.0 |
| R2 = | 566.77 | D2 = 0.73 | | |
| R3 = | 150.61 | D3 = 7.81 | n2 = 1.78590 | $\nu 2$ = 44.2 |
| R4 = | 68.82 | D4 = 27.35 | | |
| R5 = | 174.88 | D5 = 5.86 | n3 = 1.80610 | $\nu 3$ = 40.9 |
| R6 = | 70.34 | D6 = 16.60 | | |
| R7 = | 177.05 | D7 = 16.11 | n4 = 1.80518 | $\nu 4$ = 25.4 |
| R8 = | −1764.08 | D8 = 6.35 | | |
| R9 = | 240.22 | D9 = 4.88 | n5 = 1.71300 | $\nu 5$ = 53.8 |
| R10 = | 79.25 | D10 = 20.36 | | |
| R11 = | 178.37 | D11 = 17.09 | n6 = 1.75520 | $\nu 6$ = 27.5 |
| R12 = | −303.55 | D12 = 36.53 | n7 = 1.51633 | $\nu 7$ = 64.1 |
| R13 = | −86.89 | D13 = 8.30 | | |
| R14 = | 1014.00 | D14 = 41.02 | n8 = 1.77250 | $\nu 8$ = 49.6 |
| R15 = | −69.82 | D15 = 4.88 | n9 = 1.75520 | $\nu 9$ = 27.5 |
| R16 = | 230.52 | D16 = 10.65 | | |
| R17 = | −134.41 | D17 = 4.88 | n10 = 1.88300 | $\nu 10$ = 40.8 |
| R18 = | 159.19 | D18 = 29.54 | n11 = 1.48749 | $\nu 11$ = 70.1 |
| R19 = | −107.77 | D19 = 0.73 | | |
| R20 = | 3555.27 | D20 = 21.49 | n12 = 1.69680 | $\nu 12$ = 55.5 |
| R21 = | −171.52 | D21 = 0.73 | | |
| R22 = | −5794.06 | D22 = 20.02 | n13 = 1.77250 | $\nu 13$ = 49.6 |
| R23 = | −221.47 | | | |

EXAMPLE 2

| | F = 100 | | FNo = 1:2 | $2\omega = 94°$ |
|---|---|---|---|---|
| R1 = | 235.42 | D1 = 24.39 | n1 = 1.58913 | $\nu 1$ = 61.0 |
| R2 = | 528.43 | D2 = 0.73 | | |
| R3 = | 157.25 | D3 = 7.80 | n2 = 1.71300 | $\nu 2$ = 53.8 |
| R4 = | 71.55 | D4 = 30.60 | | |
| R5 = | 176.04 | D5 = 5.85 | n3 = 1.71300 | $\nu 3$ = 53.8 |
| R6 = | 73.06 | D6 = 19.08 | | |
| R7 = | 291.49 | D7 = 16.10 | n4 = 1.80610 | $\nu 4$ = 25.4 |
| R8 = | −1122.11 | D8 = 4.88 | | |
| R9 = | 263.22 | D9 = 4.88 | n5 = 1.70154 | $\nu 5$ = 41.2 |
| R10 = | 82.23 | D10 = 19.88 | | |
| R11 = | 162.32 | D11 = 17.07 | n6 = 1.71736 | $\nu 6$ = 29.5 |
| R12 = | −866.09 | D12 = 42.61 | n7 = 1.51118 | $\nu 7$ = 51.0 |
| R13 = | −92.68 | D13 = 10.73 | | |
| R14 = | 1474.59 | D14 = 48.78 | n8 = 1.70000 | $\nu 8$ = 48.1 |
| R15 = | −75.14 | D15 = 4.88 | n9 = 1.71736 | $\nu 9$ = 29.5 |
| R16 = | 206.32 | D16 = 9.61 | | |
| R17 = | −192.25 | D17 = 4.88 | n10 = 1.83400 | $\nu 10$ = 37.2 |
| R18 = | 170.73 | D18 = 31.71 | n11 = 1.51633 | $\nu 11$ = 64.1 |
| R19 = | −122.60 | D19 = 0.73 | | |
| R20 = | 950.78 | D20 = 21.46 | n12 = 1.71300 | $\nu 12$ = 53.8 |
| R21 = | −210.78 | D21 = 0.73 | | |
| R22 = | −5543.96 | D22 = 21.95 | n13 = 1.71300 | $\nu 13$ = 53.8 |
| R23 = | −228.12 | | | |

EXAMPLE 3

| | F = 100 | | FNo = 1:2 | $2\omega = 94°$ |
|---|---|---|---|---|
| R1 = | 184.76 | D1 = 31.71 | n1 = 1.61800 | $\nu 1$ = 63.4 |
| R2 = | 439.81 | D2 = 0.73 | | |
| R3 = | 132.49 | D3 = 7.80 | n2 = 1.77250 | $\nu 2$ = 49.6 |
| R4 = | 56.06 | D4 = 32.00 | | |
| R5 = | 179.46 | D5 = 5.85 | n3 = 1.82249 | $\nu 3$ = 42.7 |
| R6 = | 64.15 | D6 = 15.89 | | |
| R7 = | 196.34 | D7 = 13.66 | n4 = 1.80518 | $\nu 4$ = 25.4 |
| R8 = | −1137.68 | D8 = 4.88 | | |
| R9 = | 215.95 | D9 = 4.88 | n5 = 1.77250 | $\nu 5$ = 49.6 |
| R10 = | 96.96 | D10 = 10.51 | | |

-continued

| | F = 100 | | FNo = 1:2 | $2\omega = 94°$ |
|---|---|---|---|---|
| R11 = | 162.98 | D11 = 17.07 | n6 = 1.80518 | $\nu 6$ = 25.4 |
| R12 = | −324.22 | D12 = 33.25 | n7 = 1.49540 | $\nu 7$ = 65.9 |
| R13 = | −78.04 | D13 = 8.29 | | |
| R14 = | 2233.96 | D14 = 24.39 | n8 = 1.79952 | $\nu 8$ = 42.2 |
| R15 = | −63.41 | D15 = 4.88 | n9 = 1.80610 | $\nu 9$ = 25.4 |
| R16 = | 204.84 | D16 = 14.20 | | |
| R17 = | −139.35 | D17 = 4.88 | n10 = 1.88300 | $\nu 10$ = 40.8 |
| R18 = | 146.34 | D18 = 24.39 | n11 = 1.49700 | $\nu 11$ = 81.6 |
| R19 = | −121.89 | D19 = 0.73 | | |
| R20 = | 1772.80 | D20 = 19.51 | n12 = 1.77250 | $\nu 12$ = 49.6 |
| R21 = | −172.03 | D21 = 0.73 | | |
| R22 = | −2469.11 | D22 = 20.49 | n13 = 1.77250 | $\nu 13$ = 49.6 |
| R23 = | −181.21 | | | |

What is claimed is:

1. An inverted telephoto type wide angle objective of large relative aperture comprising:
   three lens groups, from front to rear, the first lens group having a negative refractive power and having, front front to rear, a positive meniscus lens of convex curvature toward the front, a negative meniscus lens of convex curvature toward the front, a negative meniscus lens of convex curvature toward the front, a positive lens and a negative meniscus lens of convex curvature toward the front, the second lens group having a positive refractive power and having a cemented bi-convex lens, and the third lens group having a positive refractive power and having, from front to rear, a cemented lens of a positive lens and a negative lens, a cemented lens of a negative lens and a positive lens, and two positive lenses.

2. A wide angle objective as in claim 1, including a stop in a space between the second and third lens groups and satisfying the following conditions:

$$0.72 < |f_I|/f < 0.79 \text{ where } f_I < 0 \quad (1)$$

$$2.9 < D_T/f < 3.6 \quad (2)$$

$$1.2 < D_{I,II}/D_{III} < 1.7 \quad (3)$$

where
  f is the focal length of the entire system;
  $f_I$ is the focal length of the first lens group;
  $D_T$ is the total length of the objective;
  $D_{I,II}$ is the distance from the first surface of the first lens group to the last surface of the second lens group; and
  $D_{III}$ is the distance from the first to the last surface of the third lens group.

3. A wide angle objective as in claim 2, and satisfying the following conditions:

$$f1 > f4 \quad (4)$$

$$|f2| > |f3| \text{ where } f2, f3 < 0 \quad (5)$$

$$1.7 < (n2+n3)/2 \quad (6)$$

$$\nu 1 > \nu 4 \quad (7)$$

where
  fi is the focal length of the i-th lens element counting from the front;
  ni is the index of refraction of the glass forms i-th lens element counting from the front; and $\nu i$ is the Abbe number of the glass forming the i-th lens element.

4. A wide angle objective as in claim 3, and satisfying the following conditions:

$$0.75 < |R13|/f < 0.95 \text{ where } R13 < 0 \quad (8)$$

$$50 < \nu 7 \quad (9)$$

$$25 < \nu 6 < 30 \quad (10)$$

where Ri is the radius of curvature of the i-th lens surface counting from the front.

5. A wide angle objective as in claim 4, and satisfying the following conditions:

$$0.30 < n10 - n11 \quad (11)$$

$$1.4 < R18/f < 1.8 \quad (12)$$

$$35 < \nu 10 \quad (13)$$

$$\nu 9 < 30 \quad (14)$$

$$1.7 < (n12 + n13)/2. \quad (15)$$

* * * * *